United States Patent
Watano et al.

(10) Patent No.: US 10,955,553 B2
(45) Date of Patent: Mar. 23, 2021

(54) SENSOR SYSTEM FOR COMPENSATING INFORMATION PROCESSING RATE

(71) Applicant: Koito Manufacturing Co., Ltd., Tokyo (JP)

(72) Inventors: Yuichi Watano, Shizuoka (JP); Shigeyuki Watanabe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/408,936

(22) Filed: May 10, 2019

(65) Prior Publication Data
US 2019/0353783 A1 Nov. 21, 2019

(30) Foreign Application Priority Data
May 18, 2018 (JP) .............................. JP2018-096094

(51) Int. Cl.
| H04N 5/225 | (2006.01) |
| G01S 17/86 | (2020.01) |
| G01S 7/497 | (2006.01) |
| G01S 17/931 | (2020.01) |

(52) U.S. Cl.
CPC .............. G01S 17/86 (2020.01); G01S 7/497 (2013.01); G01S 17/931 (2020.01); H04N 5/2253 (2013.01); H04N 5/2258 (2013.01)

(58) Field of Classification Search
CPC ................................ G01S 7/86; G05D 1/0055
See application file for complete search history.

(56) References Cited

U.S. PATENT DOCUMENTS

| 9,544,490 | B2 * | 1/2017 | Tomiyasu | H04N 5/232 |
| 9,720,415 | B2 * | 8/2017 | Levinson | G01S 7/497 |
| 9,762,810 | B2 * | 9/2017 | Conneely | H04N 5/3572 |
| 10,196,041 | B2 * | 2/2019 | Mori | H05B 1/0236 |
| 10,290,324 | B2 * | 5/2019 | Lai | G11B 27/10 |
| 10,435,029 | B2 * | 10/2019 | Fendt | G06F 1/206 |
| 2006/0115120 | A1 * | 6/2006 | Taniguchi | B60R 1/00 382/104 |
| 2013/0131908 | A1 * | 5/2013 | Trepagnier | G01S 7/4817 701/23 |
| 2016/0117635 | A1 * | 4/2016 | Parker | G06Q 20/203 705/28 |
| 2018/0143324 | A1 * | 5/2018 | Keilaf | G01S 7/497 |
| 2018/0259966 | A1 * | 9/2018 | Long | G08G 1/00 |

(Continued)

FOREIGN PATENT DOCUMENTS

JP 2010-185769 A 8/2010

*Primary Examiner* — Gary C Vieaux
(74) *Attorney, Agent, or Firm* — Abelman, Frayne & Schwab

(57) ABSTRACT

A sensor system mounted on a vehicle includes: a first sensor configured to acquire information on a first area outside the vehicle; a second sensor configured to acquire information on a second area that partially overlaps with the first area outside the vehicle; and a controller configured to change an information acquisition rate of the first sensor and an information acquisition rate of the second sensor, in which when the information acquisition rate of one of the first sensor and the second sensor falls below a predetermined value, the controller increases the information acquisition rate of the other sensor to be higher than the predetermined value.

7 Claims, 3 Drawing Sheets

(56) References Cited

U.S. PATENT DOCUMENTS

| | | | | |
|---|---|---|---|---|
| 2018/0364700 A1* | 12/2018 | Liu | .................... | G05D 1/0055 |
| 2019/0064805 A1* | 2/2019 | Frazzoli | ............... | G05D 1/0246 |
| 2019/0178974 A1* | 6/2019 | Droz | .................... | G01S 7/4814 |
| 2019/0353784 A1* | 11/2019 | Toledano | ................ | G01S 17/48 |

* cited by examiner

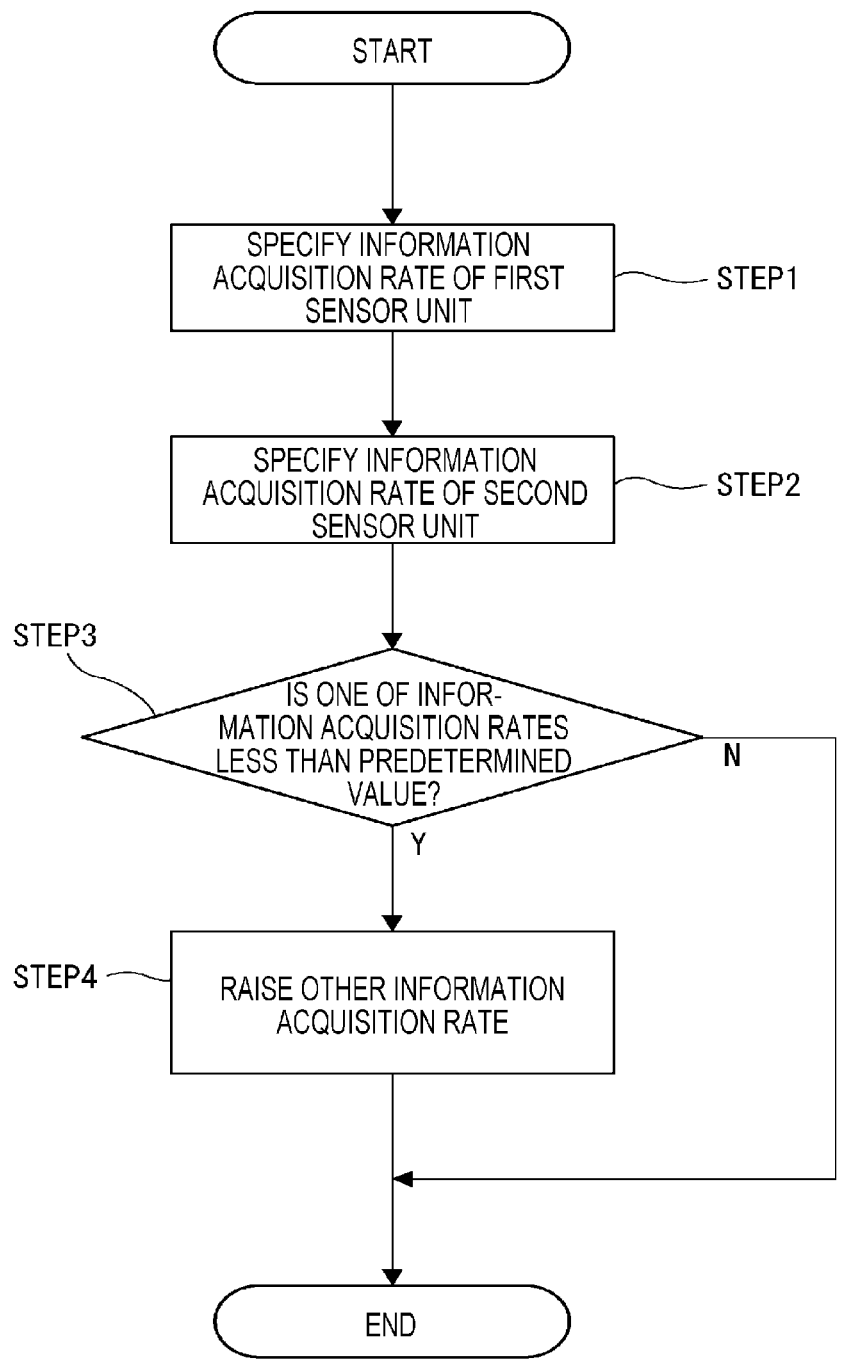

SENSOR SYSTEM FOR COMPENSATING INFORMATION PROCESSING RATE

CROSS-REFERENCE TO RELATED APPLICATIONS

This application is based on and claims priority from Japanese Patent Application No. 2018-096094, filed on May 18, 2018, with the Japan Patent Office, the disclosure of which is incorporated herein in its entirety by reference.

TECHNICAL FIELD

The present disclosure relates to a sensor system mounted on a vehicle.

BACKGROUND

In order to implement a driving support technique for a vehicle, it is necessary to mount a sensor on the vehicle body for detecting information outside the vehicle. Examples of such sensors may include a LiDAR (light detection and ranging) sensor or a camera (see, e.g., Japanese Patent Laid-Open Publication No. 2010-185769). As the driving support technique for a vehicle is advanced, an amount of information acquired per unit (information acquisition rate) tends to increase. As the information acquisition rate is increased, a calorific value from the sensor may not be ignored.

SUMMARY

The present disclosure is to suppress decrease of information acquisition capability while suppressing a calorific value of the sensor system mounted on a vehicle.

An aspect for achieving the object is a sensor system mounted on a vehicle, including: a first sensor configured to acquire information on a first area outside the vehicle; a second sensor configured to acquire information on a second area that partially overlaps with the first area outside the vehicle; and a controller configured to change an information acquisition rate of the first sensor and an information acquisition rate of the second sensor, in which, when the information acquisition rate of one of the first sensor and the second sensor falls below a predetermined value, the controller increases the information acquisition rate of the other sensor to be higher than the predetermined value.

As a reason that the information acquisition rate of one of the sensor units becomes less than the predetermined value, it is considered that a protection function for suppressing the calorific value of the sensor unit is effective, or some abnormality occurs in the operation of the sensor. In this case, the decrease of information acquisition capability on the premise of detection by both of the sensor units occurs, in particular, in an overlapped area where the first area and the second area overlap with each other. However, it is possible to compensate for the decrease of the information processing rate of one of the sensors and to suppress the decrease of the information acquisition capability in the overlapped area by increasing the information acquisition rate of the other sensor unit. Therefore, it is possible to suppress the decrease of the information acquisition capability while suppressing the calorific value of the sensor system mounted on the vehicle.

When the other sensor is a LiDAR sensor unit, the information acquisition rate may be increased by increasing the number of light sources that emit detection light, or by increasing a scanning frequency of the detection light.

When the other sensor is a camera, the information acquisition rate may be increased by increasing a frame rate.

One of the first sensor and the second sensor may be a LiDAR sensor or the camera.

In the present specification, the "sensor unit" refers to a constituent unit of a component that has a required information detection function and is able to be distributed as a single unit.

In the present specification, "driving support" refers to a control process that at least partially performs at least one of driving operations (steering wheel operation, acceleration, and deceleration), monitoring of the running environment, and backup of the driving operations. That is, the driving support includes the meaning from a partial driving support such as collision damage mitigation brake function and lane-keep assist function to a full automatic driving operation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a view illustrating an operation flow of the sensor system of FIG. 1.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an embodiment will be described in detail with reference to accompanying drawings. In the respective drawings used in the following description, a scale is suitably changed in order to have a recognizable size of each element.

Figure 1:
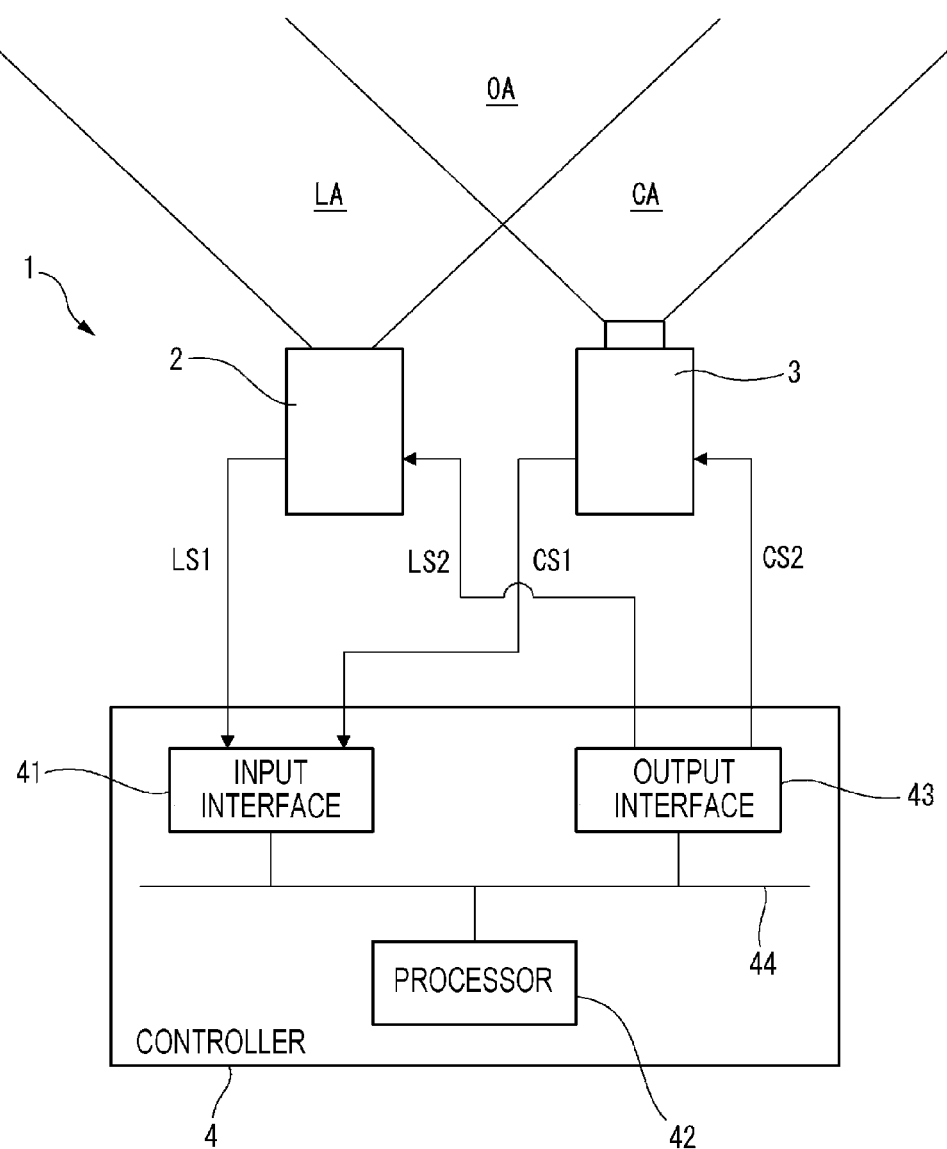
FIG. 1 is a view illustrating a functional configuration of a sensor system according to an embodiment.

FIG. 1 is a view illustrating a functional configuration of a sensor system 1 according to an embodiment. The sensor system 1 is mounted on a vehicle.

The sensor system 1 includes a LiDAR sensor unit 2. The LiDAR sensor unit 2 has a configuration for emitting invisible light, and a configuration for detecting returned light resulted from reflection of the invisible light by at least an object present outside the vehicle. The LiDAR sensor unit 2 may include a scanning mechanism that changes the emission direction (that is, detection direction) and sweeps the invisible light as necessary. For example, infrared light having a wavelength of 905 nm may be used as invisible light.

The LiDAR sensor unit 2 may acquire a distance to the object related to the returned light, based on, for example, a time taken from a timing at which the invisible light is emitted in a certain direction until the returned light is detected. Further, information on the shape of the object related to the returned light may be acquired by accumulating such distance data in association with the detection position. In addition to or in place of this, information on properties such as a material of the object related to the returned light may be acquired, based on the difference between the wavelengths of the emitted light and the returned light.

The sensor system 1 includes a camera unit 3. The camera unit 3 is a device for acquiring an image as information of the outside of the vehicle. The image may include one of a still image and a moving image. The camera unit 3 may include a camera sensitive to visible light, or may include a camera sensitive to infrared light.

Figure 2:
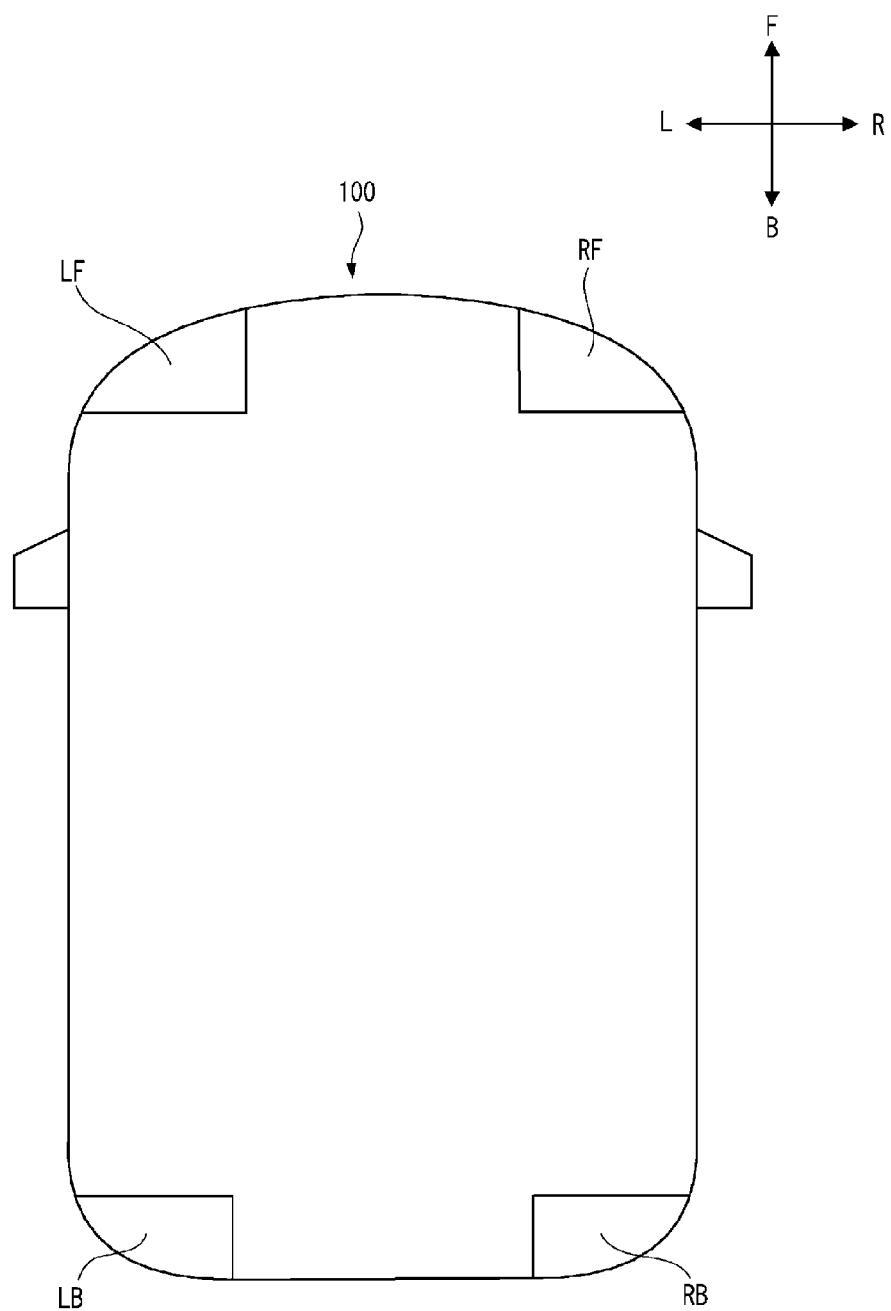
FIG. 2 is a view illustrating a vehicle on which the sensor system of FIG. 1 is mounted.

The LiDAR sensor unit 2 and the camera unit 3 may be accommodated in a common housing so as to configure a single sensor module and may be mounted on an appropriate place in the vehicle (e.g., a left front side corner portion LF of the vehicle illustrated in FIG. 2). Alternatively, the LiDAR sensor unit 2 and the camera unit 3 may form a part of two sensor modules independent from each other. The two sensor modules may be mounted on two separated places in the vehicle (e.g., the left front side corner portion LF and a right front side corner portion RF, or the left front side corner portion LF and a left back side corner portion LB of the vehicle illustrated in FIG. 2).

As illustrated in FIG. 1, a detectable area LA of the LiDAR sensor unit 2 and a detectable area CA of the camera unit 3 partially overlap each other (overlapped area OA). The LiDAR sensor unit 2 is an example of the first sensor. The camera unit 3 is an example of the second sensor. The detectable area LA of the LiDAR sensor unit 2 is an example of the first area. The detectable area CA of the camera unit 3 is an example of the second area.

The LiDAR sensor unit 2 acquires information in the detectable area LA with a predetermined information acquisition rate, and outputs a detection signal LS1 that corresponds to the information. The camera unit 3 acquires information in the detectable area CA at a predetermined information acquisition rate, and outputs a detection signal CS1 that corresponds to the information. In the present specification, the "information acquisition rate" refers to an amount of information acquired per unit time.

The sensor system 1 includes a controller 4. The controller 4 includes an input interface 41, a processor 42, an output interface 43, and a communication bus 44. The input interface 41, the processor 42, and the output interface 43 are configured to be capable of exchanging signals and data via the communication bus 44.

The detection signal LS1 output from the LiDAR sensor unit 2 and the detection signal CS1 output from the camera unit 3 are input to the input interface 41.

The processor 42 is configured to acquire the detection signal LS1 and the detection signal CS1 input to the input interface 41, and to execute a predetermined information process. The expression "to acquire the detection signal" refers to bringing the detection signal input to the input interface 41 into a state where a predetermined information process is possible via an appropriate circuit configuration.

The processor 42 is configured to transmit a control signal LS2 to the LiDAR sensor unit 2 via the output interface 43. The control signal LS2 is a signal for controlling the operation of the LiDAR sensor unit 2, and has a function of controlling at least the information acquisition rate of the LiDAR sensor unit 2.

In the same manner, the processor 42 is configured to transmit a control signal CS2 to the camera unit 3 via the output interface 43. The control signal CS2 is a signal for controlling the operation of the camera unit 3, and has a function of controlling at least the information acquisition rate of the camera unit 3.

That is, the controller 4 is capable of changing the information acquisition rate of the LiDAR sensor unit 2 and the information acquisition rate of the camera unit 3.

The LiDAR sensor unit 2 may have a protection function for avoiding thermal failure by autonomously decreasing the information acquisition rate when the operating temperature exceeds a predetermined value. For example, the LiDAR sensor unit 2 may have one of a configuration for monitoring the detectable area LA with a plurality of detection light beams emitted from a plurality of light sources, and a configuration for detecting information by scanning the detectable area LA with at least one detection light beam emitted from at least one light source. In the former case, the information acquisition rate is decreased by reducing the number of light sources that emit detection light beam. In the latter case, the information acquisition rate is decreased by lowering the scanning frequency of the detection light beam. Since this protection function itself is well known, detailed descriptions on the configuration thereof will be omitted.

The camera unit 3 may have a protection function for avoiding thermal failure by autonomously decreasing the information acquisition rate when the operating temperature exceeds a predetermined value. For example, the information acquisition rate of the camera unit 3 is decreased by lowering a frame rate that corresponds to the number of images in the detectable area CA acquired per unit time. Since this protection function itself is well known, detailed descriptions on the configuration thereof will be omitted.

In the sensor system 1 configured as described above, the processor 42 of the controller 4 is configured to be capable of executing processes illustrated in FIG. 3.

First, the processor 42 specifies the information acquisition rate of the LiDAR sensor unit 2, based on the amount of data included in the detection signal LS1 input to the input interface 41 (STEP1).

Subsequently, the processor 42 specifies the information acquisition rate of the camera unit 3, based on the amount of data included in the detection signal CS1 input to the input interface 41 (STEP2).

The order of STEP1 and STEP2 may be reversed, or STEP1 and STEP2 may be performed at the same time.

Subsequently, the processor 42 determines whether one of the information acquisition rate of the LiDAR sensor unit 2 and the information acquisition rate of the camera unit 3 that are specified is less than a predetermined value (STEP3).

When it is determined that the information acquisition rate of one of the sensor units is less than the predetermined value (Y in STEP3), the processor 42 performs a process that increases the information acquisition rate of the other sensor unit (STEP4).

For example, when it is determined that the information acquisition rate of the LiDAR sensor unit 2 specified in STEP1 is less than the predetermined value, the processor 42 generates the control signal CS2 so as to increase the information acquisition rate of the camera unit 3 specified in STEP2, and transmits the control signal CS2 to the camera unit 3 via the output interface 43. Specifically, an operation that increases the frame rate of the camera unit 3 is performed by the control signal CS2.

As a reason that the information acquisition rate of the LiDAR sensor unit 2 specified in STEP1 becomes less than the predetermined value, it is considered that the protection function for suppressing the calorific value of the LiDAR sensor unit 2 is effective, or some abnormality occurs in the operation of the LiDAR sensor unit 2. In this case, the decrease of information acquisition capability on the premise of detection by both of the sensor units occurs, in particular, in the overlapped area OA where the detectable area LA of the LiDAR sensor unit 2 and the detectable area CA of the camera unit 3 overlap with each other. However, it is possible to compensate for the decrease of the information processing rate of the LiDAR sensor unit 2 and to suppress the decrease of the information acquisition capability in the overlapped area OA by increasing the information acquisition rate of the camera unit 3.

In the same manner, when it is determined that the information acquisition rate of the camera unit 3 specified in STEP2 is less than the predetermined value, the processor 42 generates the control signal LS2 so as to increase the information acquisition rate of the LiDAR sensor unit 2 specified in STEP1, and transmits the control signal LS2 to the LiDAR sensor unit 2 via the output interface 43. Specifically, according to the control signal LS2, at least one of the operation that increases the number of light sources that emits the detection light beams and the operation that increases the scanning frequency of the detection light beam is performed.

As a reason that the information acquisition rate of the camera unit 3 specified in STEP2 becomes less than the predetermined value, it is considered that the protection function for suppressing the calorific value of the camera unit 3 is effective, or some abnormality occurs in the operation of the camera unit 3. In this case, the decrease of information acquisition capability on the premise of detection by both of the sensor units occurs, in particular, in the overlapped area OA where the detectable area LA of the LiDAR sensor unit 2 and the detectable area CA of the camera unit 3 overlap with each other. However, it is possible to compensate for the decrease of the information processing rate of the camera unit 3 and to suppress the decrease of the information acquisition capability in the overlapped area OA by increasing the information acquisition rate of the LiDAR sensor unit 2.

Therefore, it is possible to suppress the decrease of the information acquisition capability while suppressing the calorific value of the sensor system 1 mounted on the vehicle.

When it is determined that the information acquisition rate of one of the sensor units is equal to or higher than the predetermined value (N in STEP3), the processor 42 terminates the process.

The function of the processor 42 that has been described may be implemented by a general-purpose microprocessor operating in cooperation with the memory. Examples for the general-purpose microprocessor may include CPU, MPU, and GPU. The general-purpose microprocessor may include a plurality of process cores. Examples for the memory may include ROM and RAM. A program that executes a process described later may be stored in ROM. The program may include an artificial intelligence program. Examples for the artificial intelligence program may include a learned neural network based on deep learning. The general-purpose microprocessor may designate at least some of the program stored in the ROM and develop it on the RAM, and execute the above process in cooperation with the RAM. Alternatively, the function of the processor 42 described above may be implemented by a dedicated integrated circuit such as a microcontroller, FPGA, and ASIC.

The controller 4 may be arranged in an arbitrary position in the vehicle. The controller 4 may be implemented by, for example, a main ECU that is in charge of a central control process in a vehicle, or by a sub-ECU interposed between the main ECU and each sensor unit.

The LiDAR sensor unit as an example of the first sensor in the above embodiment may be substituted with a camera unit or a millimeter wave sensor unit.

The millimeter wave sensor may include a configuration for sending a millimeter wave, and a configuration for receiving a reflected wave as a result of reflection of the millimeter wave by an object present outside the vehicle. Examples for millimeter wave frequencies may include, for example, 24 GHz, 26 GHz, 76 GHz, and 79 GHz. The millimeter wave sensor may acquire a distance to the object related to the reflected light, based on, for example, time from a timing at which the millimeter wave is sent in a certain direction until the reflected light is received. Further, information on the movement of the object related to the reflected wave may be acquired by accumulating such distance data in association with the detection position.

The camera unit as an example of the second sensor in the above embodiment may be substituted with a LiDAR sensor unit or a millimeter wave sensor unit.

In the above embodiment, the LiDAR sensor unit 2 has a protection function for autonomously suppressing the calorific value. However, the LiDAR sensor unit 2 may be configured to output an abnormality signal in a case where the operation temperature exceeds a predetermined value. In this case, the abnormality signal is input to the input interface 41 of the controller 4. In response to the input of the abnormality signal, the processor 42 generates the control signal LS2 for lowering the information acquisition rate of the LiDAR sensor unit 2, and transmits the control signal LS2 to the LiDAR sensor unit 2 via the output interface 43.

In the above embodiment, the camera unit 3 has a protection function for autonomously suppressing the calorific value. However, the camera unit 3 may be configured to output an abnormality signal in a case where the operation temperature exceeds a predetermined value. In this case, the abnormality signal is input to the input interface 41 of the controller 4. In response to the input of the abnormality signal, the processor 42 generates the control signal CS2 for lowering the information acquisition rate of the camera unit 3, and transmits the control signal CS2 to the camera unit 3 via the output interface 43.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:
1. A sensor system mounted on a vehicle, comprising:
a first sensor configured to acquire information on a first area outside the vehicle;
a second sensor configured to acquire information on a second area that partially overlaps with the first area outside the vehicle; and
a controller configured to change an information acquisition rate of the first sensor and an information acquisition rate of the second sensor,
wherein, when the controller determines that an operation temperature of one of the first sensor and the second sensor exceeds a first predetermined value according to acquisition of the information, the controller lowers the information acquisition rate of the one of the first sensor and the second sensor to suppress a calorific value of the one of the first sensor and the second sensor, and when the controller determines that the information acquisition rate of the one of the first sensor and the second sensor lowered by the controller falls below a second predetermined value while the information acquisition rate of the one of the first sensor and the second sensor is being lowered by the controller, the controller increases the information acquisition rate of the other one of the first sensor and the second sensor to be higher than the second predetermined value.

2. The sensor system according to claim 1, wherein the other one of the first sensor and the second sensor is a LiDAR sensor, and the controller increases the information acquisition rate of the other one of the first sensor and the second sensor by increasing the number of light sources that emit detection light.

3. The sensor system according to claim 2, wherein the one of the first sensor and the second sensor is a LiDAR sensor or a camera.

4. The sensor system according to claim 1, wherein the other one of the first sensor and the second sensor is a camera, and the controller increases the information acquisition rate of the other one of the first sensor and the second sensor by increasing a frame rate.

5. The sensor system according to claim 4, wherein the one of the first sensor and the second sensor is a LiDAR sensor or a camera.

6. The sensor system according to claim 1, wherein the one of the first sensor and the second sensor is a LiDAR sensor or a camera.

7. The sensor system according to claim 1, wherein the other one of the first sensor and the second sensor is a LiDAR sensor, and the controller increases the information acquisition rate of the other one of the first sensor and the second sensor by increasing a scanning frequency of detection light.

\* \* \* \* \*